United States Patent

[11] 3,591,764

[72] Inventors Jury Matveevich Taran
ul. Bolshaya Kitaevskaya 99, kv. 38;
David Solomonovich Vorona, ul.
Scherbakova 51, kv. 21, both of Kiev,
U.S.S.R.
[21] Appl. No. 801,531
[22] Filed Feb. 24, 1969
[45] Patented July 6, 1971

[54] METHOD OF CHECKING METAL EXPULSION IN RESISTANCE WELDING
7 Claims, 11 Drawing Figs.

[52] U.S. Cl. ................................................ 219/110
[51] Int. Cl. ................................................ B23k 9/10, B23k 11/24
[50] Field of Search ........................................ 219/109, 110

[56] References Cited
UNITED STATES PATENTS
2,433,964  1/1948  Tarbox et al. ............. 219/110
3,068,350  12/1962  Archer ...................... 219/110

Primary Examiner—Bernard A. Gilheany
Assistant Examiner—Roy N. Envall, Jr.
Attorney—Waters, Roditi, Schwartz & Nissen ABSTRACT: The present invention concerns a method and device for detecting metal expulsions in resistance welding wherein mechanical or electric change occurring in the welding zone are utilized for the estimation of time and quantity parameters of the expulsion.

METHOD OF CHECKING METAL EXPULSION IN RESISTANCE WELDING

The present invention relates to methods of detecting metal expulsion in resistance welding, and devices for accomplishing these methods, and it can be utilized for estimating quality of welded articles, as well as for studying the effect of the electrical and mechanical parameters of welding equipment on the process of formation of a weld joint.

The visual method to detect metal expulsion in resistance welding that is most widely used at present consists in an external inspection of the article surfaces after welding to evaluate the probability of expulsion by the presence of metal particles lacking a firm bond with the welded articles.

This method is disadvantageous in that it consumes much time, for the expulsion trace may be found beyond the welding zone, and in order to find it all the surfaces adjacent the welding zone must be inspected.

Another disadvantage consists in that when welding plate structures it is practically impossible to determine metal expulsion there without breaking the structure, since the weld is hidden behind the work surfaces.

One more disadvantage is that errors in determining the quality of welding cannot be avoided, since external inspection may find no traces left by the expulsion if, for instance, the expulsion traces happened to be beyond the field of vision, were incidentally removed during transportation or removed while destroying the weld joint for a more detailed inspection. And, finally, an expulsion may occur in the course of welding and leave no trace whatsoever. The disadvantages of the visual method also include the fact that the moment of formation of the expulsion, as well as its intensity, cannot be estimated even roughly.

An object of the present invention is to develop a method of detecting metal expulsions in resistance welding, which will permit making a quality estimation thereof, as well as detecting them with a probability close to a unity.

Another object of the present invention is to provide a device permitting the expulsion characteristics to be measured in the course of welding.

These and other objects are achieved by the method of detecting metal expulsion in resistance welding according to this invention, wherein the electrical and mechanical changes occurring in the welding zone are converted, at the time of the welding current, into electric signals whose time of appearance and amplitude determine the moment of formation and the intensity of the expulsions.

In checking the expulsions occurring when welding components essentially, of a circular shape, it is advisable to measure the voltage gradient across the components, the variation of the latter determining the moment of formation and the intensity of the expulsion.

When detecting the expulsions in a welding process wherein mainly components of a plane shape are welded, the mechanical energy of the shock wave formed by the expulsion and propagating through the components and electrodes, should be converted into an electric signal by whose time of appearance and amplitude the moment of formation and the intensity of the expulsion are determined.

The device to detect the expulsions by the shock wave energy comprises, according to the invention, a converter of shock wave energy into an electric signal, which converter is coupled to one of the working electrodes of the welding equipment and is connected with a time and amplitude discriminator of its output signal. The parameters of the discriminator output signal serve to determine the time of appearance and the intensity of the expulsion.

When the expulsions are checked by the variation of the voltage gradient in the weld zone a differentiating electric circuit is coupled to the electrodes to convert the voltage gradient across the workpieces into an electric signal. This circuit is connected to the time and amplitude discriminator of electric signals characterizing the expulsion parameters.

This time and amplitude discriminator preferably, is in the form of an electric band-pass filter coupled to the converter output, and a shaper of auxiliary pulses whose duration equals the welding current duration. The outputs of the filter and the shaper are connected to a time and amplitude selector of electric signals characterizing the expulsion parameters.

The pulse shaper in the discriminator may comprise several series-connected generators of gate pulses whose total duration equals the welding current pulse duration, each of the gate generators being coupled to time and amplitude selector of electric signals characterizing the expulsion parameters.

Employed as a converter of the shock wave mechanical energy into electric signals may be a piezoelectric transducer.

The proposed method and devices permit complete and definite information on the expulsion to be obtained irrespective of whether the weld is hidden or not, and whether or not there are any traces of the expulsion remaining, since the expulsion parameters, i.e. its intensity and time of formation, can be measured and registered by electric measuring instruments, for example, an oscilloscope.

The invention is further exemplified with embodiments thereof, taken in conjunction with the accompanying drawings, wherein.

The proposed method of detecting metal expulsions in resistance welding is based on utilizing the effect of the expulsion on the mechanical process taking place in the welding zone.

During the expulsion a part of the molten metal is splashed out from the welding zone by the forces of internal pressure. The instantaneous drop of this pressure causes a respective elastic deformation in the workpieces.

Figure 1:
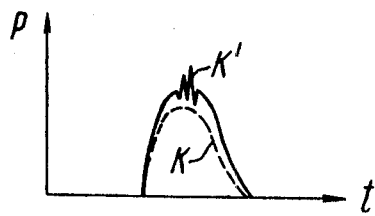
FIG. 1 illustrates the curves of instantaneous variations of dynamic pressure in resistance welding with an expulsion and without it, curves K' and K, respectively.

The process of expulsion (rupture of the surface shell retaining the molten metal in the welding zone, and a splash of a part of the volume thereof) occurs in centesimal fractions of a microsecond in the form of an explosion. The shock wave (curve K' in FIG. 1) formed as a result of local deformations spreads in the elastic medium of the workpieces and electrodes contacting them. The amplitude of mechanical oscillations of the wave is proportional to the expulsion intensity, and the time of the shock wave appearance corresponds to the moment when the expulsion in developed.

Hence, converting the shock wave mechanical energy into an electric signal, and analyzing it for the time of appearance and amplitude, the moment of the expulsion origination and its intensity can be determined.

Figure 2:
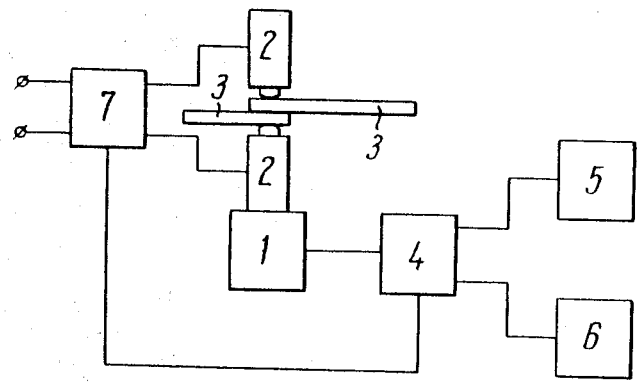
FIG. 2 is a block diagram of the device, made according to the invention, for detecting metal expulsion by the shock wave produced in the workpieces.

The detecting for the presence of metal expulsions in resistance welding by using the shock wave parameters is practically effected in a device whose block diagram is shown in FIG. 2.

In this device, transducer 1 is fixed to working electrode 2 of the welding equipment, and is in acoustical contact with workpieces 3.

Transducer 1 is a piezoelectric cell converting the mechanical oscillations caused by the expulsion and spreading from the welding zone along working electrode 2, into an electric signal. Connected to the output of transducer 1 is a discriminator 4 which separates and amplifies, on the background of interferences, electric signals carrying information on the expulsion and characterized by a certain frequency and time of appearance.

Also connected to discriminator 4 is the welding current breaker 7 which supplies signals to the input of discriminator 4 the signals marking the start and end of the welding, i.e. the time within which current is fed through the workpieces. The outputs of discriminator 4 are electrically connected with an indicator 5 and electronic relay 6. Indicator 5 registers output signals of the discriminator 4 characterizing the expulsion, and consists of an electric measuring instrument, for instance, an oscilloscope. Electronic relay 6 performs remote switching of light or sound signaling devices (not shown in the drawings) to mark the welding expulsion, or devices (not shown in the drawings either) to reject and sort articles welded with or without an expulsion.

Discriminator 4 comprises a band-pass filter 8 (FIG. 3) and gate generator 9, which are connected to the input of amplitude and time selector 10, and an electronic unit 11 to switch in generator 9 which is coupled to unit 11 through electric delay lines 12 and 13.

Band-pass filter 8 connected with the output of transducer 1 provides for separation and amplification of electric signals within a range of 20 to 50 kc., and suppression of interference signals whose frequency is beyond the pass band. Band-pass filter 8 can be made, for example, as a voltage (or current) amplifier including resistors with a frequency feedback.

Generator 9 shapes square gate pulses whose duration equals the time of current passage through the workpieces. These pulses set the time within which the electric signals characterizing the expulsion parameters are measured at the output of the amplitudes and time selector 10. Gate generator 9 can be made, for example, as a Schmitt trigger wherein transition from one stable state to the other takes place when a positive trigger signal is supplied, while a negative trigger signal causes a reverse transition.

The amplitude and time selector 11 is made as an AND coincidence circuit. It separates and amplifies those electric signals coming to its input simultaneously with the gating pulses, which exceeds the preset limit level.

The inputs of gate generator 9 are connected to breaker 7 through unit 11 and delay lines 12 and 13. Unit 11 converts the electric signals of breaker 7 which determine the start and end of the welding, into electric signals triggering generator 9. Converter 11 can be made, for example, as a followup Schmitt trigger whose input is connected with a winding located on the core of the welding transformer (not shown in the drawings). Induced in the winding is a voltage, the amplitude and duration of which are proportional to the welding current.

Electric lines 12 and 13 serve to delay the triggering pulses of unit 11 fed to the inputs of generator 9. In view of the necessity for accurate determination of the moment of the expulsion formation with respect to the start of welding, the delay compensates for the lag of the signal of transducer 1 with regard to the signal of breaker 7, which lag is due to the difference in propagation velocity between the signal of transducer 1 and the shock wave from the welding zone up to the place where the piezoelectric cell of transducer 1 is fixed to electrode 3. Used as delay lines 12 and 13 may be, for example, driven multivibrators (control and measuring relays).

Figure 4:
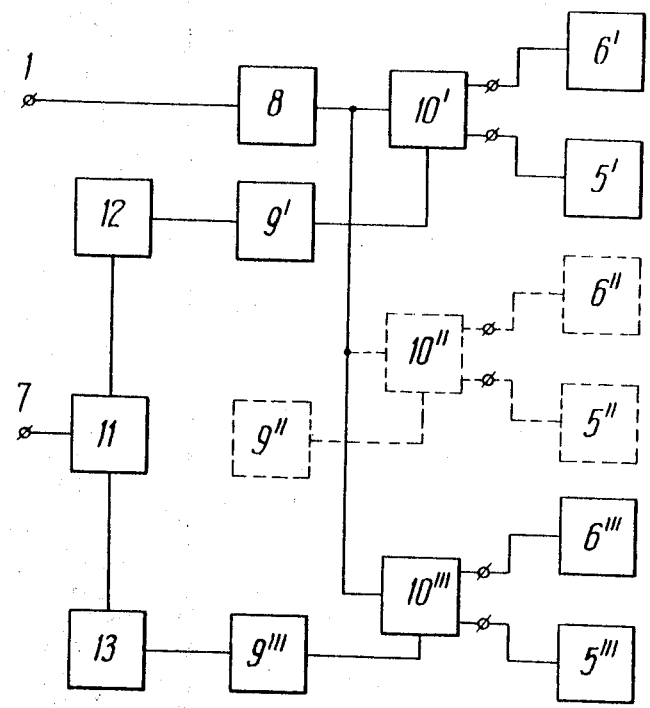
FIG. 4 is a unit diagram of the discriminator having several electric channels to measure the amplitude and time of the signal characterizing the expulsion.

For separate measurement of the parameters of several expulsions in one point of welding, discriminator 4 is made according to the so-called multichannel circuit, as is shown in FIG. 4.

Unlike the above-described design, a multichannel discriminator comprises generators $9'$, $9''$, and $9'''$, and amplitude-time selectors $10'$, $10''$, $10'''$, the number of which equals the number of the generators. Connected to the outputs of the selectors are indicators $5'$, $5''$, and $5'''$, as well as electronic relays $6'$, $6''$, and $6'''$. Generators $9'$, $9''$ and $9'''$ are series connected to each other.

The output of generator $9'$ is connected to the input of the amplitude-time selector $10'$ and to the input of generator $9''$, while the input of generator $9'$ is coupled, through delay line 12, to the output of unit 11. The output of generator $9''$ is connected to the input of the amplitude-time selector $10''$, and to one of the inputs of generator $9'''$, whose second input is through delay line 13 coupled to unit 11.

Generators $9'$, $9''$, and $9'''$ shape trains of successive square pulses whose total duration equals the time of current passage through the workpieces, each of the amplitude-time selectors $9'$, $9''$, and $9'''$ providing for separation and amplification of electric signals within the time intervals equaling the duration of the gate pulses fed to the respective selectors.

Generators $9'$ and $9''$ are made as one-shot multivibrators (control and measuring relays), and generator $9'''$ is designed as a Schmitt trigger.

The multichannel discriminator may comprise any number of gate generators.

Figure 5:
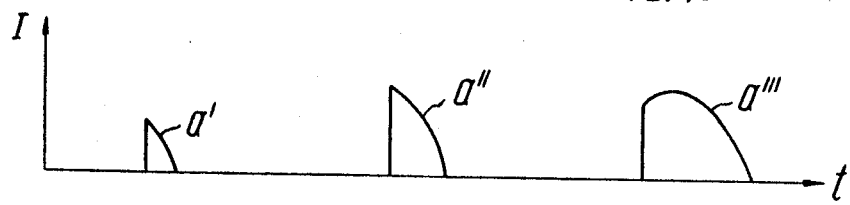
FIG. 5 illustrates a plot of the welding current pulses.
Figure 3:
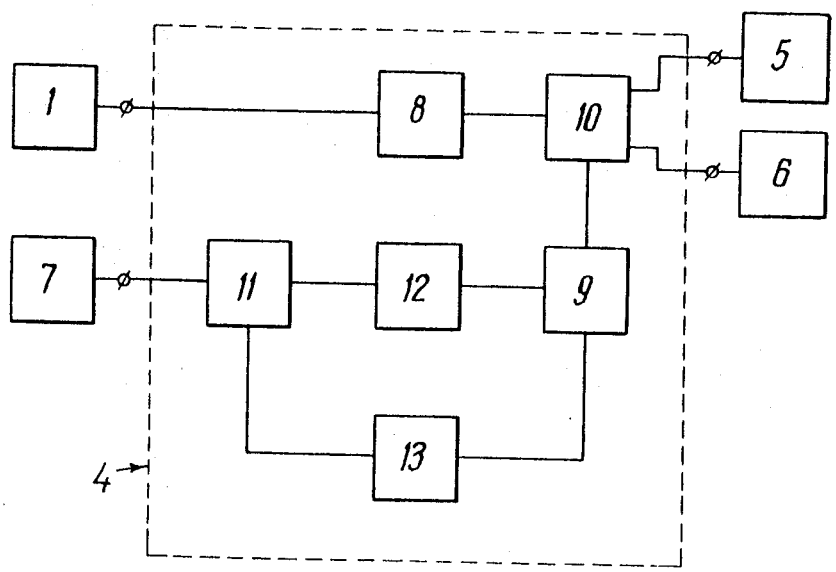
FIG. 3 is a block diagram of the discriminator made according to the invention, which permits determining the amplitude and time of formation of the electric signals characterizing the expulsion.

The device to detect metal expulsions in resistance welding effected by a train of unipolar current pulses (curves $a'$, $a''$, $a'''$ in FIG. 5), which device includes discriminator 4 made according to the diagram given in FIG. 3, operates as follows.

Figure 6:
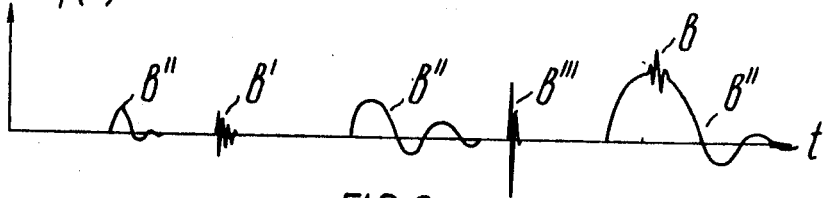
FIG. 6 is a plot of the output voltage of the piezoelectric transducer.

In the course of welding, the metal expulsion excites in workpieces 3 an elastic shock wave which spreads across electrode 2 and reaches transducer 1. The piezoelectric cell of transducer 1 converts the shock wave energy into an electric signal proportional to the expulsion intensity. The output information of the transducer besides the useful signal (curve b in FIG. 6) characterizing the expulsion, comprises interference signals: those of shocks (curve $b'$) caused by the operation of auxiliary mechanisms (not shown in the drawings) of the welding equipment, low-frequency signals (curve $b''$) caused by the change of pressure in the welding zone due to heating, as well as various occasional pulse and high frequency signals (curve $b'''$).

From the output of transducer 1 all these signals come to the input of band-pass filter 8 which passes and amplifies the electric signals with a frequency close to that of mechanical oscillations in the shock wave caused by the expulsion (experiments have proved that this frequency lies within a range of 20 to 50 Hz.).

Figure 7:
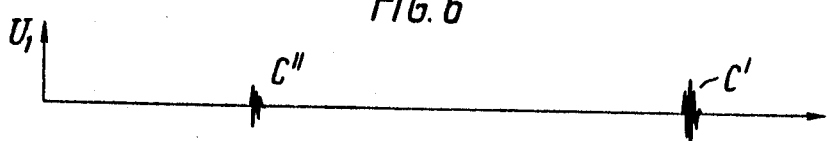
FIG. 7 is a plot of the band-pass filter output voltage in the discriminator.

Separated and amplified by filter 8 are signals carrying information on the expulsion parameters (curve $c'$ in FIG. 7), and signals marking the shocks (curve $c''$), both these types of signals arriving at the input of the amplitude and time selector 10.

Figure 8:
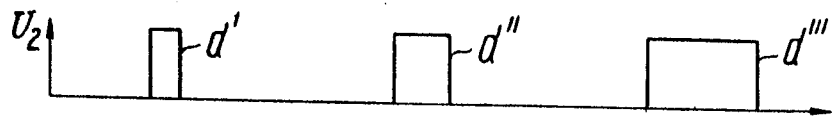
FIG. 8 is a plot of the gate pulse voltage.

Also arriving at the amplitude and time selector 10 are gate pulses (curves $d'$, $d''$, $d'''$ in FIG. 8) from the output of generator 9, the duration of these pulses equaling the time of current passage through the workpieces.

At the moment of welding current is turned on, a mechanical or electric signal is sent from breaker 7 to mark the start of the welding. In unit 11 triggering generator 9 of the discriminator, this signal is converted into a pulse which after a delay in line 12 is passed to the input of generator 9. The latter starts shaping a square gate pulse. At the moment the welding current is turned off a signal is again sent to unit 11 coming then through delay line 13 to generator 9, shaping of the gate pulse being terminated. Hence, the gate pulse duration always equals the time of welding current passage.

Figure 9:
FIG. 9 is a plot of the device output signal characterizing the expulsion.

As pulse $d'''$ (FIG. 8) and signal $c'$ (FIG. 7) coincide in time, at the output of the amplitude and time selector 11 there is formed a pulse characterizing the expulsion parameters (curve $e$ in FIG. 9).

Since signal $c''$ (FIG. 7) and gating pulses $d'$ and $d''$ (FIG. 8) reach the input of selector 10 at different times, the pulse associated with the interference caused by a shock, missing from the output of discriminator 4.

The signal thus derived at the output of discriminator 4 (FIG. 9) and characterizing the expulsion, is measured by indicator 5 and simultaneously triggers relay 6 which connects the expulsion signaling arrangement.

The expulsion detecting device with a multichannel discriminator, whose diagram is shown in FIG. 4, operates in the same way as the above-mentioned device, and does not require further explanation. The only difference consists in that within the time of one welding current pulse a train of gate pulses is formed instead of one such, and the signals characterizing the pulse are measured by each of the amplitude-time selectors 10', 10'', and 10'''.

Figure 10:
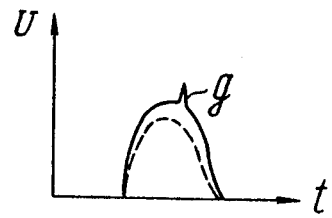
FIG. 10 is a plot of voltage across workpieces welded with the expulsion.

Another version of the method to check metal expulsions in resistance welding is based on utilizing variations in the voltage gradient. The tests have proved that during an expulsion of metal, the resistance in the welding zone varies due to instantaneous reduction of the volume of molten metal, resulting in an increased voltage across the workpieces. The magnitude of this signal (curve g in FIG. 10) characterizes the expulsion intensity.

Figure 11:
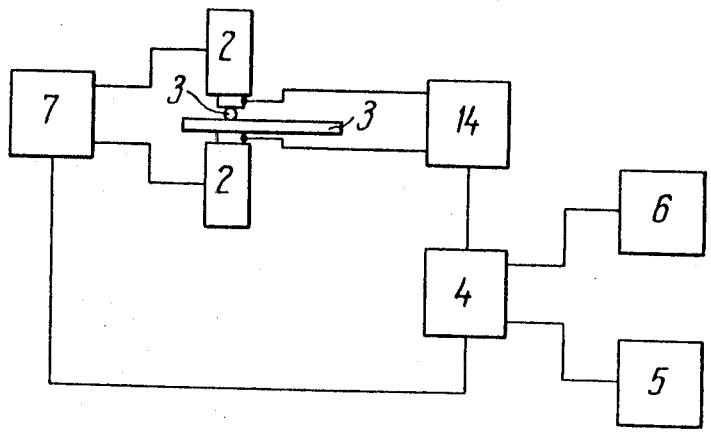
FIG. 11 is a block diagram of the device, made according to the invention, to carry into effect the method of checking metal expulsion in resistance welding by the voltage gradient across the workpieces.

This method can be carried into effect by means of a device shown in FIG. 11. This device is essentially similar to the above-described device, shown in FIG. 2, but in contrast to the latter it includes a converter 14 of the voltage gradient across the workpieces into an electric signal characterizing the expulsion parameters. In addition, in the device made according to FIG. 11 an ordinary pulse amplified is employed as band-pass filter 8 (FIG. 3).

Converter 14 consists of a differentiating RC circuit.

The operation of this device requires no additional explanation, as it is similar to the operation of the above-described device with the only difference being that the input of discriminator 4 is supplied with an electric signal associated with the voltage gradient variation, and not with the shock wave.

Application of the proposed invention allows detecting metal splashes in the welding of radio parts with a high degree of reliability.

Thus, in a case when 100 components were welded, the proposed device detected 48 components out of 50 that were welded with expulsions.

In addition, it should be noted that the possibility to determine the time of the expulsion appearance permits revealing the causes of the expulsion so as to introduce appropriate changes in the welding process.

Although only a few embodiments of the present invention have been described in this specification, other versions thereof are possible as well, being characterized by replacement of some electric units or their connections without varying the idea of the invention which is formulated in the appended claims.

What I claim is:

1. A device to carry into effect the method of detecting the expulsion by a voltage gradient, comprising: a differentiating RC circuit connected to the working electrodes of the welding equipment and converting the voltage gradient on the workpieces into electric signals; an electric band-pass filter coupled to the output of said RC circuit and separating the electric signals characterizing the expulsion; an electric amplitude-time selector of the signals separated by the filter, which selector is coupled to the output of said filter, and produces pulses whose parameters define the intensity and the time of appearance of the expulsion with respect to the time of action of the welding current; a generator connected to said selector, this generator shaping gate pulses with a duration equal to that of the welding current, and controlling the work of said selector.

2. A device for detecting the expulsion by a shock wave during resistance welding, comprising: a converter of the shock wave mechanical energy into electric signals, said welding being accomplished with a welding device including working electrodes carrying a welding current said converter being connected to one of the working electrodes of the welding device; an electric band-pass filter coupled to the output of said converter for separating the electric signals representing the expulsion, a signal selector coupled to the output of said filter and producing pulses whose parameters define the intensity and time of appearance of the expulsion with regard to the time of action of the welding current; a generator of gating pulses, said gating pulses having a pulse duration equal to that of the duration of the welding current, said generator being connected to said signal selector for controlling its operation.

3. A device for detecting the expulsion by a shock wave during resistance welding, comprising: a converter of the shock wave mechanical energy into electric signals, said welding being accomplished with a welding device including working electrodes carrying a welding current said converter being connected to one of the working electrodes of the welding device; an electric band-pass filter coupled to the output of said converter for separating the electric signals representing the expulsion, a plurality of amplitude-time selectors, each of said amplitude-time selectors being coupled to the output of said filter, said selectors producing pulses whose parameters define the intensity of the expulsion and the time of their appearance with respect to the time of action of the welding current; a plurality of generators of electric pulses, respective ones of said generators being coupled to only one of said plurality of selectors for shaping gate pulses of a preset duration, the total duration of the pulses of said generators being equal to the welding current duration, said plurality of generators being equal in number of said plurality of selectors.

4. A method for detecting the metal expulsion in resistance welding where the welding zone undergoes electrical and mechanical changes comprising converting said electrical and mechanical changes into an electrical signal and measuring said electrical signal to determine the moment of formation of the weld and the intensity of the metal expulsion.

5. A method for detecting as set forth in claim 4, wherein said converting is accomplished with piezoelectric means.

6. A method for detecting as set forth in claim 4, including the steps of supplying a pulse of a predetermined duration for actuating said resistance welding, and separating background noise from said electrical signal during said predetermined time duration.

7. A method for detecting as set forth in claim 8, wherein said measuring step includes the steps of registering the commencement of said electrical signal with respect to the commencement of said pulse.